United States Patent [19]
Kindle et al.

[11] 3,847,727

[45] Nov. 12, 1974

[54] RUBBER-METAL ADHESION USING HALOGENATED QUINONE AND RESORCINOL-ALDEHYDE CONDENSATION PRODUCT

[75] Inventors: Robert W. Kindle, Cheshire; Robert R. Barnhart; Philip T. Paul, both of Naugatuck, all of Conn.

[73] Assignee: Uniroyal, Inc., New York, N.Y.

[22] Filed: Jan. 22, 1973

[21] Appl. No.: 325,478

Related U.S. Application Data

[62] Division of Ser. No. 131,470, April 5, 1971, Pat. No. 3,728,192.

[52] U.S. Cl.............. 161/215, 117/128.7, 152/359, 156/124, 156/334, 156/335, 156/338, 161/217
[51] Int. Cl...................... B32b 15/02, B32b 15/06
[58] Field of Search................................ 117/128.7; 161/217–219, 215; 152/359; 156/124, 306, 334, 335, 338

[56] References Cited
UNITED STATES PATENTS

| | | | |
|---|---|---|---|
| 2,960,426 | 11/1960 | O'Mahoney | 117/128.7 X |
| 3,676,256 | 7/1972 | Borger | 156/306 |
| 3,677,809 | 7/1972 | Klement | 117/128.7 X |
| 3,751,331 | 8/1973 | Dane et al. | 161/217 X |

*Primary Examiner*—Harold Ansher
*Attorney, Agent, or Firm*—James J. Long

[57] ABSTRACT

The adhesion of rubber to metal (e.g., wire tire cord) is improved by incorporating a halogenated quinone (e.g., chloranil) and a resorcinol-aldehyde condensate (e.g., condensation product of resorcinol and acetaldehyde) into the rubber.

7 Claims, No Drawings

RUBBER-METAL ADHESION USING HALOGENATED QUINONE AND RESORCINOL-ALDEHYDE CONDENSATION PRODUCT

This is a division of application Ser. No. 131,470 filed Apr. 5, 1971, now U.S. Pat. No. 3,728,192.

BACKGROUND OF THE INVENTION

1. Field of the Invention

This invention relates to a method of adhering rubber to metal, a laminate obtained by such method, and a rubber stock useful in such method.

2. Description of the Prior Art

Chloranil, marketed under the trademark "Vulklor", was suggested many years ago for promoting adhesion of rubber to metal (Naugatuck Chemical Bulletin No. 194, Vulklor, July 15, 1953) but unfortunately the effect was not as great as would be desirable.

U.S. Pat. No. 2,329,852, Reid, Sept. 21, 1943 discloses a rubber to metal adhesive comprising rubber isomer and a non-sulfur vulcanizing agent (e.g., tetrachloroquinone plus hexamethylenetetramine). In the present invention, halogenated quinone is not employed as a vulcanizing agent, but as an adhesion promoting ingredient in combination with resorcinol aldehyde resin.

German Patent No. 1,228,799, Continental Gummi - Werke, Nov. 17, 1966, exemplifies increasing adhesion to polyester textile by incorporating into rubber tetrahalo - p -benzoquinone with or without resorcinol and hexamethylenetetramine - tetramine or paraldehyde. Adhesion to metal is not closed.

Resorcinol - aldehyde condensation products have been used, along with certain methylene denors, to promote adhesion of rubber to textiles (U.S. Pat. Nos. 3,256,137 Danielson, June 14, 1966 and 3,266,970, Paul, Aug. 16, 1966). Combinations of resorcinol denor and methylene donor have also been proposed for rubber to wire adhesion (Naugatuck Chemical Bulletins: No. 265A "Bonding Agents", Feb. 15, 1965; "Findings" No. 19, Sept. 1969; No. 200-B44A "Bonding Agents" Dec. 11, 1969; also U.S. Pat. No. 3,517,722, Endter et al., June 30, 1970). It has been desired to provide improved adhesion to metal, over that obtained with such prior systems.

SUMMARY OF THE INVENTION

The invention is based on the discovery that improved adhesion of rubber to metal is obtained by incorporating in the rubber, prior to laminating to metal and vulcanizing, two ingredients: 1. A halogenated quinone; and 2. A condensation product of resorcinol and an aldehyde.

DETAILS OF THE INVENTION

It is well known to use rubber in the manufacture of pressure hose, drive belts, and pneumatic tires, but when used in this manner it is necessary to reinforce the rubber with a reinforcing element. Textile material such as cotton, rayon, or nylon have been used but wire cord has been found to be more desirable under certain conditions of use especially in pneumatic tires and particularly in pneumatic truck tires, bias-belted tires and radial tires. Maximum reinforcement of the rubber is obtained when maximum adhesion is produced between the laminate of rubber and reinforcing element to form a unitary structure. Equally important is the requirement that the laminate of the reinforcing element and rubber remain in bonded relationship with each other throughout the useful life of the structure in which the laminate is used. It is preferred that no separation occur between the surface of the wire and the rubber bonded thereto but under the severe conditions pneumatic truck tires are subjected to it becomes difficult to preserve the major portion of the bond at the metal surface of the reinforcing wire cable.

This invention relates, accordingly, to the adhesion of rubber to metal which is especially important in the manufacture of tires using wire as the cord element.

It has now been found, as indicated, that a combination of a halogenated quinone and a resorcinol-aldehyde condensate provides improved adhesion between the rubber and the wire or other metal surfaced material. In practice the halogenated quinone and the resorcinol-aldehyde condensate are incorporated as dry additives into the rubber prior to calendering or otherwise applying to the wire.

While any halogenated quinone including monochloroquinone, dichloroquinone, dichloronaphthoquinone, trichloroquinone, bromanil and chloranil (tetrachloro-p-benzoquinone) can be used, chloranil is the preferred material. The halogen may be chlorine, bromine, fluorine or iodine located at any or all of the available positions on a benzoquinone, naphthoquinone, etc., nucleus.

The resorcinol-aldehyde condensates include the condensates of resorcinol with an alkyl aldehyde having one to four carbon atoms or benzaldehyde. Examples of the alkyl aldehydes are formaldehyde, acetaldehyde, propionaldehyde, n-butyraldehyde, and isobutyraldehyde.

The resorcinol and alkyl aldehyde or benzaldehyde are readily condensed in an easily controlled reaction using an acid such as acetic, oxalic or hydrochloric acid as a catalyst in aqueous or alcohol medium on standing or by heating at temperatures up to reflux. The ratio of the aldehyde to the resorcinol used in the condensation reaction will generally be from one to two moles of aldehyde, preferably 1.2–1.3 moles, per two moles of resorcinol. When the condensation is finished the water is removed, usually under vacuum, to yield a resin. Formaldehyde and acetaldehyde yield pulverulent resins. Higher aldehydes yield soft resins. Such preformed resins are in an acetone soluble, fusible, non-cross-linked state; they contain about 15 percent unreacted resorcinol which acts as a fluxing agent. (Further details are given in U.S. Pat. Nos. 3,256,137 and 3,266,970, referred to above.)

The rubber intermediate the wire plies may be applied in the usual manner by calendering a coating of a solid vulcanizable rubber composition containing the halogenated quinone and the resorcinol-aldehyde condensation product on the wire material, generally on both sides, e.g., as in the conventional coating of wire tire cord fabric with tire carcass stock. The two adhesion promoting chemicals, viz., the halogenated quinone and performed condensation product of resorcinol and the aldehyde, may be mixed with the conventional compounding ingredients in the solid rubber in a Banbury mixer and the rubber composition then calendered on the wire material. After building the rubber-coated wire material into the finished article, e.g., a tire, the assembly is heated to vulcanize the rubber.

The amounts of adhesion promoting substances employed in the invention are not critical. In practice, 0.1 to 5.0 parts each of halogenated quinone and of resorcinol-aldehyde condensate per 100 parts rubber may be used with the preferred amounts averaging 1–2 parts per 100 parts rubber.

The solid rubber used in the present invention for making the rubber and metal laminates for use in tire manufacture and for other purposes may be natural (Hevea) rubber or conjugated diolefine polymer synthetic rubber or mixtures of any of them including their reclaims. Such conjugated diolefine polymer synthetic rubbers are polymers of butadienes-1,3, e.g., butadiene-1,3, isoprene, 2,3-dimethyl-butadiene-1,3, and copolymers of mixtures thereof, and copolymers of mistures of one or more such butadienes-1,3, for example, up to 75 percent by weight of such mixture of one or more monoethylenic compounds which contain a

group where at least one of the disconnected valences is attached to an electronegative group, that is, a group which substantially increases the electrical dissymmetry or polar character of the molecule. Examples of compounds which contain a

group and are copolymerizable with butadienes-1,3 are aryl olefines, such as styrene, vinyl toluene, alpha-methyl-styrene, chlorostyrene, dichlorostyrene, vinyl napthalene; the alpha methylene carboxylic acids and their esters, nitriles and amides, such as acrylic acid, methyl acrylate, ethyl acrylate, methyl methacrylate, acrylonitrile, methacrylonitrile, methacrylamide; vinyl-pyridines, such as 2-vinylpyridine, 2-methyl-5-vinyl-pyridine; methyl vinyl ketone, methyl isopropenyl ketone. Examples of such conjugated diolefine polymer synthetic rubbers are polybutadiene, polyisoprene, butadiene-styrene copolymers (SBR) and butadiene-acrylonitrile copolymers. The rubber may be solution-prepared or emulsion-prepared, stereo-specific or otherwise. Other conventional unsaturated sulfur-vulcanizable rubbers may be used, such as EPDM (rubbery terpolymer of ethylene, propylene and a copolymerizable non-conjugated diene such as hexadiene, dicyclopentadiene, dicyclocatadine methylene norlorene, ethylidene norlorene, tetrahydro indene, etc.). The rubber intermediate the plies will also contain conventional compounding and vulcanizing ingredients such as carbon black, rubber processing or softening oils which may be added as such or may be present from oil-extended rubbers, antioxidants, sulfur, zinc oxide and accelerators.

The adhesive ingredients are incorporated into at least the portion of the vulcanizable rubber stock compounded for sulfur vulcanization adjacent to the interface of the metal element and the rubber coating before vulcanization. The vulcanizable rubber stock containing the adhesive ingredients may serve as a "tie gum" between the metal element and the remainder of the rubber body, which need not necessarily contain the adhesive ingredients.

While brass plated steel wire is the wire commonly used, the invention is applicable to other metals such as nickel and chromium. Unplated steel wire may also be used. For further details of the metals employed in the practice of this invention reference may be had to U.S. Pat. No. 3,517,722 referred to above, especially column 5, line 17 to column 6, line 23. Thus, in addition to conventional brass or bronze coated steel wire, there may be mentioned reinforcing elements surfaced with metals or alloyw of metals including lead, zinc, tin, copper, aluminum, silver, Wood's alloy, Rose's alloy and various other alloys such as zinc-titanium, lead-copper, lead-tin, aluminum-copper, aluminum-gold, aluminum-zinc, aluminum-tin, lead-antimony, cadmium-zinc, copper cadmium, tin-indium, silver-tin, silver-zinc, copper-zinc, antimony-tin, antimony-zinc, copper-aluminum, Dow metal, brazing and soldering alloys and the like.

The following examples will serve to illustrate the practice of the invention in more detail.

EXAMPLE I

The masterbatch shown in Table I may be prepared in a Banbury mixer:

Table I

| Masterbatch | |
|---|---|
| Natural rubber | 30.00 |
| B R | 25.00 |
| Oil extended SBR | 67.50 |
| Carbon black | 60.00 |
| Zinc oxide | 5.00 |
| Stearic acid | 1.50 |
| Light aromatic oil | 10.0 |
| Octylated diphenylamine antioxidant | 1.0 |
| N-t.-Butyl benzothiazole sulfeneamide | 1.0 |
| Diphenyl guanidine | 0.20 |
| Sulfur | 3.00 |
| | 204.20 |

The BR may be "Phillips Cis 4" cis-polybutadiene (approximately 95 percent cis content). The oil extended SBR may be SBR 1715, containing 45.00 parts of styrene-butadiene copolymer (23.5 percent styrene) and 22.5 parts of naphthenic petroleum hydrocarbon extended oil. The light aromatic oil may be Sun Oil's 4240 petroleum hydrocarbon processing oil. Portions of the masterbatch may be further mixed the ingredients shown in Table II. The resorcinol-acetaldehyde resin may be produced as shown in example 1 of U.S. Pat. No. 3,266,970. The resulting four stocks A, B, C and D have the physical properties shown in Table II after vulcanization as indicated in said table.

Table II

| | | Adhesive Stocks: Vulcanized Properties | | | |
|---|---|---|---|---|---|
| | | A | B | C | D |
| Master Batch | | 204.20 | 204.20 | 204.20 | 204.20 |
| Resorcinol-Acetaldehyde Resin | | — | 2.0 | 2.0 | — |
| Chloranil | | — | — | 1.0 | 1.0 |
| Mooney viscosity at 212°F. | | 37 | 40 | 49 | 44 |
| 300% Modulus 320°F. Cure | | | | | |
| | 15° | 2180 | 1610 | 990 | 1610 |
| | 30° | 1700 | 1820 | 1680 | 2200 |
| Tensile | 15° | 2390 | 2500 | 2080 | 2550 |
| | 30° | 2100 | 2400 | 2250 | 2390 |
| Elongation | 15° | 320 | 450 | 570 | 450 |
| | 30° | 290 | 380 | 380 | 330 |

The wire adhesions of each of stocks A, B, C & D were determined according to A.S.T.M.-D2229-68 wherein the pull in pounds to remove a two-inch piece of brass coated steel wire (National Standard 7 × 4 × .007 tire cord) embedded in the rubber prior to vulcanization, and the adhesion is measured after vulcanization. The results are shown in Table III.

Table III

| Adhesion 250°F | Adhesion Results Cure Time at 320°F | A | B | C | D |
|---|---|---|---|---|---|
| Unaged | 15° | 84 | 87 | 111 | 112 |
|  | 30° | 86 | 81 | 137 | 111 |
|  | 60° | 68 | 87 | 112 | 82 |

Another criterion for determining the effectiveness of adhesion is a visual estimation of the amount of rubber stock left on the wire as shown in Table IV.

Table IV

| | Adhesion and % Stock Left on Wire | | | |
|---|---|---|---|---|
| | | A | B | C | D |
| Aged 24 hrs. at 250°F. | 15° | 64 | 79 | 107 | 68 |
| Estimated % stock on wire | | 75% | 90% | 100% | 100% |
| | 30° | 54 | 84 | 111 | 81 |
| Estimated % stock on wire | | 25% | 80% | 100% | 100% |
| | 60° | 43 | 92 | 110 | 68 |
| Estimated % stock on wire | | 0% | 100% | 100% | 75% |
| Shelf aged 7 weeks Wire adhesion at 250°F. | | | | | |
| Unaged | 60° | 46 | 99 | 100 | 95 |
| Estimated % stock on wire | | 10% | 90% | 100% | 100% |
| Aged 24 hours at 250°F | | | | | |
| | 60° | 38 | 72 | 114 | 101 |
| Estimated % stock on wire | | 0% | 75% | 100% | 75% |

EXAMPLE II

This example demonstrates the superiority of the combination of halogenated quinone and resorcinol-aldehyde resin, over the combination of a methylene donor adhesive chemical (5-methylol-1-aza-3,7-dioxabicyclo[3.3.0] octane) and resorcinol-aldehyde resin. The test stock is a passenger car tire carcass blend essentially as shown in Example 1, and the procedure is the same as in Example 1 except that the adhesion-promoting chemicals are shown in Table V, expressed as parts per 100 parts of rubber.

Table V

| Stock II | A | B | C |
|---|---|---|---|
| | Control | (Comparison Stock) | (Invention) |
| Resorcinol-acetaldehyde resin | — | 2 | 2 |
| 3,7-dioxabicyclo-[3.3.0] octane | — | 1 | P |
| Chloranil | — | — | 1 |

After laminating to the brass plated wire tire cord described in Example 1, curing for 60 minutes at 320°F., and adhesion testing as previously, described at 250°F. the results obtained are as shown in Table VI.

Table VI

| Stock II | A | B | C |
|---|---|---|---|
| Pounds pull | | | |
| (a) Unaged | 35 | 63 | 110+ |
| (b) Aged 24 Hrs. at 250°F. | 23 | 49 | 110+ |

EXAMPLE III

This example is similar to Example II but demonstrates the superiority of the halogenated quinone/resorcinol-aldehyde resin combination of the invention over the combination of another methylene donor adhesive chemical chemical, 2-methylol-2-nitropropane, with resorcinol aldehyde resin. The procedure is as in Example II, with the results shown in Table VII.

Table VII

| Stock III | A | B | C |
|---|---|---|---|
| | (Control) | (Comparison Stock) | (Invention) |
| (Parts of Chemical) | | | |
| Resorcinol-acetaldehyde resin | — | 2 | 2 |
| 2-methylol-2-nitropropane | — | 1 | — |
| Chloranil | — | — | 1 |
| (Adhesion-250°F.-Pounds Pull) | | | |
| (a) Unaged | 62 | 100 | 118 |
| (b) Aged 24 Hrs. at 250°F. | 49 | 81 | 107 |

EXAMPLE IV

This example illustrates the practice of the invention with an EPDM rubber tire carcass stock. The stock may be a blend of 100 parts of ethylene-propylene-ethylidene norbornene terpolymer (E/P weight ratio 60/40; iodine number 10), 80 parts of carbon black 5 parts of zinc oxide 25 parts of light process oil, 20 parts of tackifier, 0.5 parts of MBTS, 0.5 parts of Tuex, 1.0 part of Butazate and 2 parts of sulfur.

A portion of the stock containing no adhesive additions, and another portion containing resorcinol-acetaldehyde resin and chloranil are used to make test laminates to the brass plated wire tire cord and cured 60 minutes at 320°F. Adhesion tests yield the data shown in Table VIII.

Table VIII

| Stock IV | A | B |
|---|---|---|
|  | (Control) | (Invention) |
| (Parts of Chemical) |  |  |
| Resorcinol-acetaldehyde resin | — | 2 |
| Chloranil | — | 1 |
| (Adhesion 250°F - Pounds Pull) |  |  |
| (a) Unaged | 40 | 56 |
| (b) Aged 24 hrs. at 250°F. | 53 | 73 |

EXAMPLE V

Practice of the invention using NBR rubber hose stock is illustrated in this example. The bompounded vulcanizable rubber stock may contain 100 parts of butadiene-acrylonitrile copolymer rubber (27 percent acrylonitrile), 143 parts of carbon black, 12 parts of light process oil, 10 parts of tackifier, 5 parts of zinc oxide, 1.5 parts of MBTS, 1 part of diphenylamine-acetone antioxidant, 2 parts of stearic acid, and 1 part of phthalic anhydride. The wire employed is as in Example 1. The stock is laminated to the wire and cured at 320°F. for 60 minutes. Adhesion test samples made with and without the addition of the adhesive chemicals to the stock produce the results shown in Table IX.

Table IX

| Stock V- | A | B |
|---|---|---|
|  | (Control) | (Invention) |
| (Parts of Chemical) |  |  |
| Resorcinol-acetaldehyde resin | — | 2 |
| Chloranil | — | 1 |
| (Adhesion - Pounds Pull) |  |  |
| (a) Room Temperature | 102 | 192 |
| (b) 250°F | 52 | 89 |

EXAMPLE VI

A rubber stock is mixed containing 100 parts of natural rubber, 45 parts of carbon black, 2.5 parts of stearic acid, 5 parts of zinc oxide, 5 parts of pine tar, 1.5 parts of diphenylamine-acetone antioxidant, 0.45 parts of N,N-diisopropylbenzthiazyl-2-sulfenamide and 3 parts of sulfur. The wire employed is as in example I. Adhesion test pieces are made by laminating the stock (with and without admixture of adhesive chemicals) to the wire and curing at 320°F for 60 minutes. The results are shown in Table X.

Table X

| Stock VI | A | B |
|---|---|---|
|  | (Control) | (Invention) |
| (Parts of Chemical) |  |  |
| Resorcinol-acetaldehyde resin | — | 2 |
| Chloranil | — | 1 |
| (Adhesion at 250°F-Pounds Pull) |  |  |
| (a) Unaged | 69 | 132 |
| (b) Aged 24 hrs. at 250°F. | 54 | 135 |

EXAMPLE VII

Three different kinds of single strand wire of the kind used in hose and belt constructions are employed in this example: (a) 0.015 inch stainless steel; (b) 0.022 inch brass plated steel; (c) 0.028 inch brass plated steel. The rubber stock formulation is as in Example II. Cure of the adhesion test specimens is for 60 minutes at 320°F, with the results shown in Table XI.

Table XI

| Stock VII- | A | B |
|---|---|---|
|  | (Control) | (Invention) |
| (Parts of Chemical) |  |  |
| Resorcinol-Acetaldehyde resin | — | 2 |
| Chloranil | — | 1 |
| (Adhesion-Room Temperature-Pounds Pull) |  |  |
| Wire (a) | 3 | 10 |
| Wire (b) | 3 | 35 |
| Wire (c) | 4 | 33 |

EXAMPLE VIII

The basic rubber stocks and wire employed are essentially as in Example 1. Variations are made in the adhesive chemicals added with the results shown in Table XII, wherein Stock VIII-A is a control and Stocks XII-B and XII-C demonstrate the improved adhesion achieved by the invention, using the two different haloquinones shown.

Table XII

| Stock VIII- | A | B | C |
|---|---|---|---|
| Adhesion additives, parts |  |  |  |
| Resorcinol-acetaldehyde resin | — | 2 | 2 |
| Chloranil | — | 1 | — |
| 2,3 Dichloronaphthoquinone | — | — | 1 |
|  | A | B | C |
| Cured 60' at 320°F |  |  |  |
| Wire adhesion 250°F |  |  |  |
| (a) Unaged (Pounds Pull) | 62 | 120 | 99 |
| Estimated % stock on wire | 50 | 100 | 75 |
| (b) Aged 24 hrs. at 250°F (Pounds Pull) | 40 | 143 | 132 |
| Estimated % stock on wire | 0 | 75 | 75 |

EXAMPLE IX

The basic rubber stocks and the wire employed are essentially as in Example I, but the resorcinol-aldehyde resin is varied as shown in Table XIII. The resorcinol-formaldehyde resin (Stock IX-B) may be as described in U.S. Pat. No. 3,256,137, Col. 6, lines 8–12, as represented by such commercially available materials as Schenectady S1587 Resin. The resorcinol-butyraldehyde resin (Stock IX-D) may be as described in U.S. Pat. No. 3,266,970, Example 4. The resorcinol-benzaldehyde resin (Stock IX-E) may be as described in U.S. Pat. No. 3,266,970, Example 3.

Table XIII

| Stock IX- | A | B | C | D | E |
|---|---|---|---|---|---|
| Adhesion additives, parts | | | | | |
| Resorcinol-formaldehyde resin | — | 2 | | | |
| Resorcinol-acetaldehyde resin | — | | 2 | | |
| Resorcinol-butyraldehyde resin | — | | | 2 | |
| Resorcinol-benzaldehyde resin | — | | | | 2 |
| Chloranil | — | 1 | 1 | 1 | 1 |
| (Cured 60 min. at 320°F.) | | | | | |
| Wire Adhesion 250°F. | | | | | |
| (a) Unaged (Pounds Pull) | 93 | 100 | 110 | 113 | 116 |
| (b) Aged 24 Hrs. at 250°F. | 65 | 129 | 133 | 126 | 123 |
| Estimated % stock on wire | 5 | 95 | 95 | 95 | 95 |

Having thus described our invention, what we claim and desire to protect by Letters Patent is:

1. A laminate of a reinforcing element having a metal surface and a vulcanized rubber composition containing a halogenated quinone and a condensation product of resorcinol and an aldehyde selected from the group consisting of alkyl aldehydes having one to four carbon atoms and benzaldehyde.

2. A laminate as in claim 1 in which the reinforcing element is brass coated wire tire cord.

3. A laminate as in claim 1 in which the halogenated quinone is chloranil.

4. A laminate as in claim 1 in which the aldehyde is acetaldehyde.

5. A laminate as in claim 1 in which the halogenated quinone is chloranil and the aldehyde is acetaldehyde.

6. A laminate comprising an unsaturated, sulfur-vulcanizable rubber stock containing sulfur vulcanization ingredients, a halogenated quinone, and a condensation product of resorcinol and an aldehyde selected from the group consisting of alkyl aldehydes having one to four carbon atoms and benzaldehyde, said stock being vulcanized to a reinforcing element having a metal surface.

7. A laminate as in claim 6 in which the reinforcing element is brass plated steel wire, and the halogenated quinone is a chlorinated benzoquinone or naphthoquinone.

* * * * *